(12) United States Patent
Jang et al.

(10) Patent No.: US 6,892,042 B2
(45) Date of Patent: May 10, 2005

(54) COUPLING APPARATUS, DEVELOPMENT CARTRIDGE AND ELECTROPHOTOGRAPHIC PRINTER HAVING THE SAME

(75) Inventors: Kyung-hwan Jang, Seoul (KR); Byeong-hwa Ahn, Yongin (KR); Douk-soon Cha, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 234 days.

(21) Appl. No.: 10/156,797

(22) Filed: May 30, 2002

(65) Prior Publication Data

US 2003/0059233 A1 Mar. 27, 2003

(30) Foreign Application Priority Data

Sep. 26, 2001 (KR) ............................... 2001-59714

(51) Int. Cl.$^7$ .............................................. G03G 15/00
(52) U.S. Cl. ........................................ 399/167; 399/120
(58) Field of Search ................. 222/DIG. 1; 347/86; 399/119, 120, 167, 258, 262, 263

(56) References Cited

U.S. PATENT DOCUMENTS 6,032,013 A * 2/2000 Niizawa ...................... 399/262
6,173,146 B1 * 1/2001 Wang et al. ................. 399/265

* cited by examiner

Primary Examiner—Hoang Ngo
(74) Attorney, Agent, or Firm—Staas & Halsey LLP

(57) ABSTRACT

A coupling apparatus, a development cartridge, and an electrophotographic printer having the coupling apparatus. The coupling apparatus transfers a rotation force in a connected state. The coupling apparatus has a first coupler having a cylindrical-type connection portion at an end and a spiral rib spirally protruded at an outer circumference of the connection portion; and a second coupler having a circular-type main hole depressed at an end corresponding to the connection portion, and a spiral groove formed at an inner circumference of the main hole corresponding to the spiral rib. The connection portion and the spiral rib are relatively connected with the main hole and the spiral groove by being pressed, and transmit a rotation force by being rotated together.

42 Claims, 12 Drawing Sheets

COUPLING APPARATUS, DEVELOPMENT CARTRIDGE AND ELECTROPHOTOGRAPHIC PRINTER HAVING THE SAME

CROSS-REFERENCE TO RELATED APPLICATIONS

This application claims the benefit of Korean Application No. 2001-59714, filed Sep. 26, 2001, in the Korean Industrial Property Office, the disclosure of which is incorporated herein by reference.

BACKGROUND OF THE INVENTION

1. Field of the Invention

The present invention relates to a coupling apparatus to transfer power, a development cartridge and an electrophotographic printer having the coupling apparatus.

2. Description of the Related Art

Generally, an electrophotographic printer such as a laser printer or a photocopying machine has a development cartridge for forming an image. The development cartridge has a built-in toner cartridge for supplying toner, which is a development agent, and a rotatable photosensitive drum. The photosensitive drum forms an electrostatic latent image corresponding to a desired image by a light projected from a laser projection unit. In addition, a predetermined image is formed as toner supplied by a toner supply means is clung to the formed electrostatic latent image. The toner image formed on the photosensitive drum is transferred to a paper passing through the photosensitive drum and a fixing roller, and is printed.

The development cartridge is a disposable article that should be changed when the toner, which is filled inside, is consumed. Therefore, the development cartridge is removably connected with a printer body. Power can be transferred to the development cartridge from a predetermined driving unit of the printer body through a coupling apparatus when being installed in the printer body. In other words, the coupling apparatus for driving the photosensitive drum and a roller for supplying the toner is provided. One example of the coupling apparatus is shown in FIG. 1.

Referring to FIG. 1, the coupling apparatus has a slave coupler 2 disposed at one end of the photosensitive drum 1 of the development cartridge. The coupling apparatus also has a driving coupler 3 disposed in a direction of the driving unit for transmitting the driving power to the slave coupler 2. The slave coupler 2 has bar-type ribs 2a that protrude by predetermined intervals at an inner circumference of a cylinder of the slave coupler 2. Moreover, the driving coupler 3 has bar-type ribs 3a that protrude at a predetermined interval at an outer circumference of a cylinder of the driving coupler 3. Accordingly, when the driving coupler 3 is inserted into the slave coupler 2, the ribs 3a are placed between each of the ribs 2a. When the driving coupler 3 is rotated, the ribs 3a and 2a contact each other, and the driving power of the driving coupler 3 is transmitted to the slave coupler 2, thereby drawing the development cartridge.

The above coupling apparatus has a gap between the slave coupler 2 and the driving coupler 3 due to errors generated during manufacturing and assembly. Specifically, the gap is generated between an inner diameter of the slave coupler 2 and an outer diameter of the driving coupler 3. Rotation centers of the couplers 2 and 3 differ because of the gap. When the couplers 2 and 3 are rotated about the different rotation centers, a rotation velocity and a rotation force generated from the driving unit is not exactly transmitted to the development cartridge. In this case, an accuracy of the image printed on the paper is deteriorated as the rotation velocity and the rotation force of the photosensitive drum becomes inconsistent.

SUMMARY OF THE INVENTION

Accordingly, it is an object of the present invention to provide a coupling apparatus having an improved structure to transmit a rotation power exactly, a development cartridge, and an electrophotographic printer employing the same.

It is another object of the present invention to provide a coupling apparatus having elements that can be connected and separated with and from each other to transfer a rotation force when connected.

Additional objects and advantages of the invention will be set forth in part in the description which follows and, in part, will be obvious from the description, or may be learned by practice of the invention.

The foregoing and other objects and advantages of the present invention are achieved by providing a connectable/separable coupling apparatus including a first coupler including a cylindrical-type connection portion at an end thereof, and a spiral rib spirally protruding at an outer circumference of the connection portion; and a second coupler including a circular-type main hole depressed at an end corresponding to the connection portion, and a spiral groove formed at an inner circumference of the main hole corresponding to the spiral rib. The connection portion and the spiral rib are connected with the main hole and the spiral groove, respectively, by being pressed, and a rotation force is transmitted from the first coupler to the second coupler by rotating the first and second couplers together.

The foregoing and other objects and advantages of the present invention are also achieved by providing a connectable/separable coupling apparatus to transfer power in a connected state including a driving gear engaged with a driving motor; a first coupler including a first end connected with the driving gear, a cylindrical-type connection portion at a second end, and a spiral rib spirally protruding at an outer circumference of the connection portion; and a second coupler. The second coupler includes a circular-type main hole depressed at an end corresponding to the connection portion, and a spiral groove formed and an inner circumference of the main hole corresponding to the spiral rib. The connection portion and the spiral rib are connected with the main hole and the spiral groove, respectively, by being pressed, and a rotation force is transmitted from the first coupler to the second coupler by rotating the first and second couplers together.

The foregoing and other objects and advantages of the present invention are also achieved by providing a connectable/separable coupling apparatus to transfer power in a connected state, the coupling apparatus including a slave shaft; a slave gear connected with an end of the slave shaft; a slave coupler connected to and rotated with the slave gear, the slave coupler including a cylindrical-type connection portion, and a spiral rib spirally protruding at an outer circumference of the connection portion. The coupling apparatus further includes a driving motor; a driving gear engaged with the driving motor; and a driving coupler including a first end connected with the driving gear, a circular-type main hole depressed at a second end of the driving coupler corresponding to the connection portion, and a spiral groove formed at an inner circumference of the main hole corresponding to the spiral rib. The connection portion and the spiral rib are respectively connected with the main hole and the spiral groove by being inserted, and a rotation force is transferred from the driving gear to the slave gear by rotating the driving gear and slave gear together.

The foregoing and other objects and advantages of the present invention are achieved by providing a development cartridge disposed at an electrophotographic printer including a driving motor; a driving gear to transmit power by being connected with the driving motor; a first coupler coaxially connected to and rotated with the driving gear and having a cylindrical-type connection portion at an end, and a spiral rib protruding at an outer circumference of the connection portion; and a development cartridge settlement unit to expose the connection portion to an outside. The development cartridge is removably connected with the development cartridge settlement unit, and to develop an image on a printing paper. The development cartridge includes a cartridge frame; a photosensitive drum rotatably disposed at the cartridge frame; and a second coupler coaxially connected with an end of the photosensitive drum and including a circular-type main hole depressed at an end corresponding to the connection portion, and a spiral groove formed at an inner circumference of the main hole corresponding to the spiral rib. The first coupler is connected with the second coupler by being rotated and inserted into the second coupler, a rotation force of the driving motor is transmitted from the first coupler to the second coupler by rotating the first and second couplers together.

The foregoing and other objects and advantages of the present invention are achieved by providing a development cartridge disposed at an electrophotographic printer including a driving motor; a driving gear to transmit power by being connected with the driving motor; a driving coupler coaxially connected to and rotated with the driving gear and having a circular-type main hole at an end thereof and a spiral groove spirally depressed at an inner circumference of the main hole; and a development cartridge settlement unit to expose an end of the driving coupler to an outside. The development cartridge is removably connected with the development cartridge settlement unit, and develops an image on a printing paper. The development cartridge includes a cartridge frame; a photosensitive drum rotatably disposed at the cartridge frame; and a slave coupler coaxially connected with the photosensitive drum and rotated. The slave coupler includes a pole-type connection portion at an end corresponding to the main hole, and a spiral rib spirally protruding at an outer circumference of the connection portion corresponding to the spiral groove. The connection portion and the spiral rib are relatively rotated and inserted into the main hole and the spiral groove, respectively, to connect the couplers and transmit a rotation force.

The foregoing and other objects and advantages of the present invention are achieved by providing a electrophotographic printer including a main body having a cartridge fixing unit; and a development cartridge removably connected with the cartridge fixing unit to develop an image on a printing paper. The electrophotographic printer further including a driving motor installed in the main body; a driving gear to transmit a rotation force from the driving motor and to rotate; a driving coupler including a first end coaxially connected with the driving gear, a cylindrical-type connection portion, and a spiral rib spirally protruding from an outer circumference of the connection portion at a second end movably disposed in an axial direction to be exposed to the cartridge fixing unit. The electrophotographic printer further includes a connecting and separating unit to connect and separate the development cartridge with and from the main body. The development cartridge includes a photosensitive drum, a development unit to develop the image on the photosensitive drum, a slave coupler coaxially connected to the photosensitive drum, including a cylindrical-type main hole at a first end corresponding to the connection portion, and a spiral groove depressed in an inner circumference of the main hole corresponding to the spiral rib. A rotation force is transmitted to the slave coupler when connected with the driving coupler, a power of the driving motor is transmitted to the photosensitive drum and the couplers are connected by relative rotation thereof.

The foregoing and other objects and advantages of the present invention are achieved by providing an electrophotographic printer including a main body including a cartridge fixing unit; and a development cartridge removably disposed at the cartridge fixing unit to develop an image on a printing paper. The electrophotographic printer including a driving motor installed in the main body; a driving gear rotated to transmit a rotation force from the driving motor and to rotate; a driving coupler rotated by being coaxially connected with the driving gear, the driving coupler including a circular main hole at an end, and spiral grooves spirally depressed at an inner circumference of the main hole, and the driving coupler being movably disposed in an axial direction to expose the end to the fixing unit. The electrophotographic printer further includes a connecting and separating unit to connect and separate the development cartridge with and from the main body, the development cartridge including a photosensitive drum, a development unit to develop the image on the photosensitive drum, and a slave coupler coaxially connected with an end of the photosensitive drum. The slave coupler includes a connection portion with a sectional area corresponding to the main hole at an end thereof, and a spiral rib spirally protruding from an outer circumference of the connecting and separating unit corresponding to the spiral groove. A power of the driving motor is transmitted to the photosensitive drum and the couplers are connected by relative rotation thereof.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
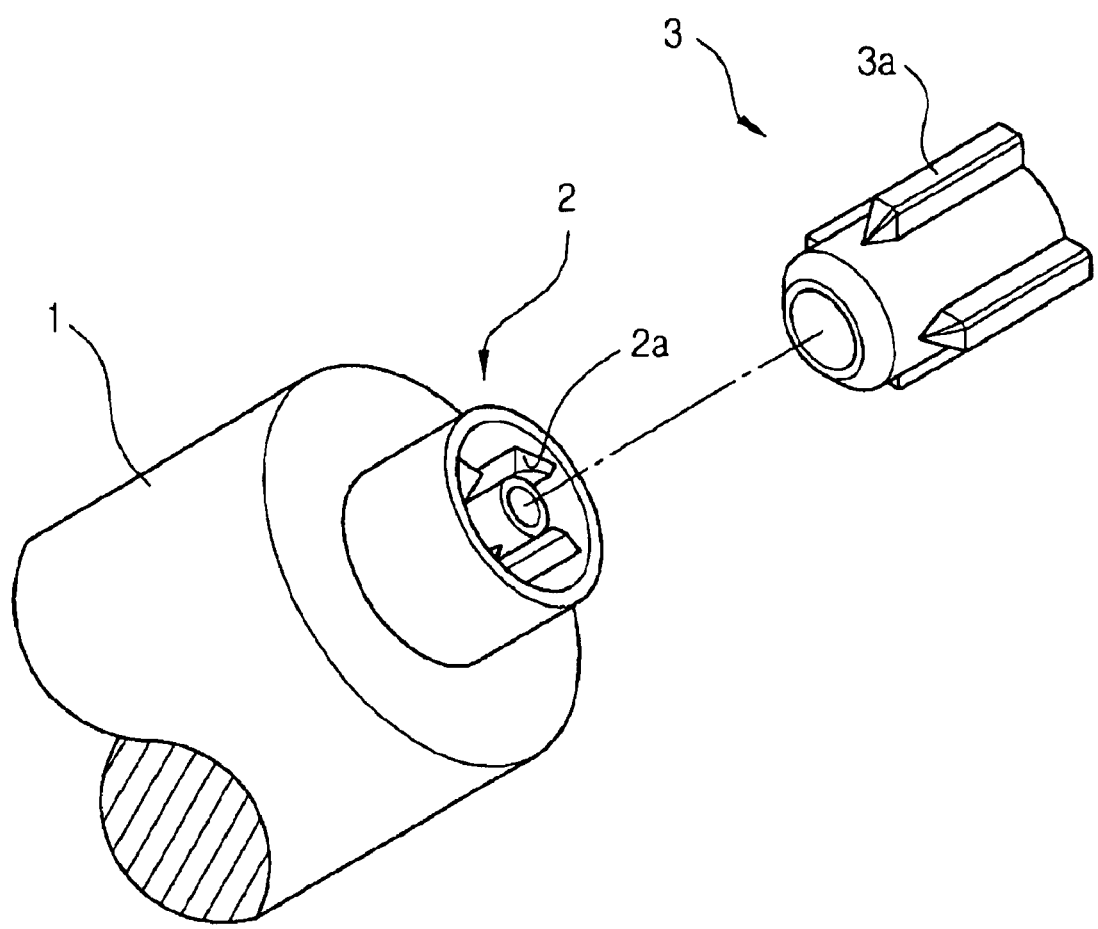
FIG. 1 is a schematic perspective view showing a conventional coupling apparatus.

Reference will now be made in detail to the present preferred embodiments of the present invention, examples of which are illustrated in the accompanying drawings, wherein like reference numerals refer to like elements throughout.

Figure 2:
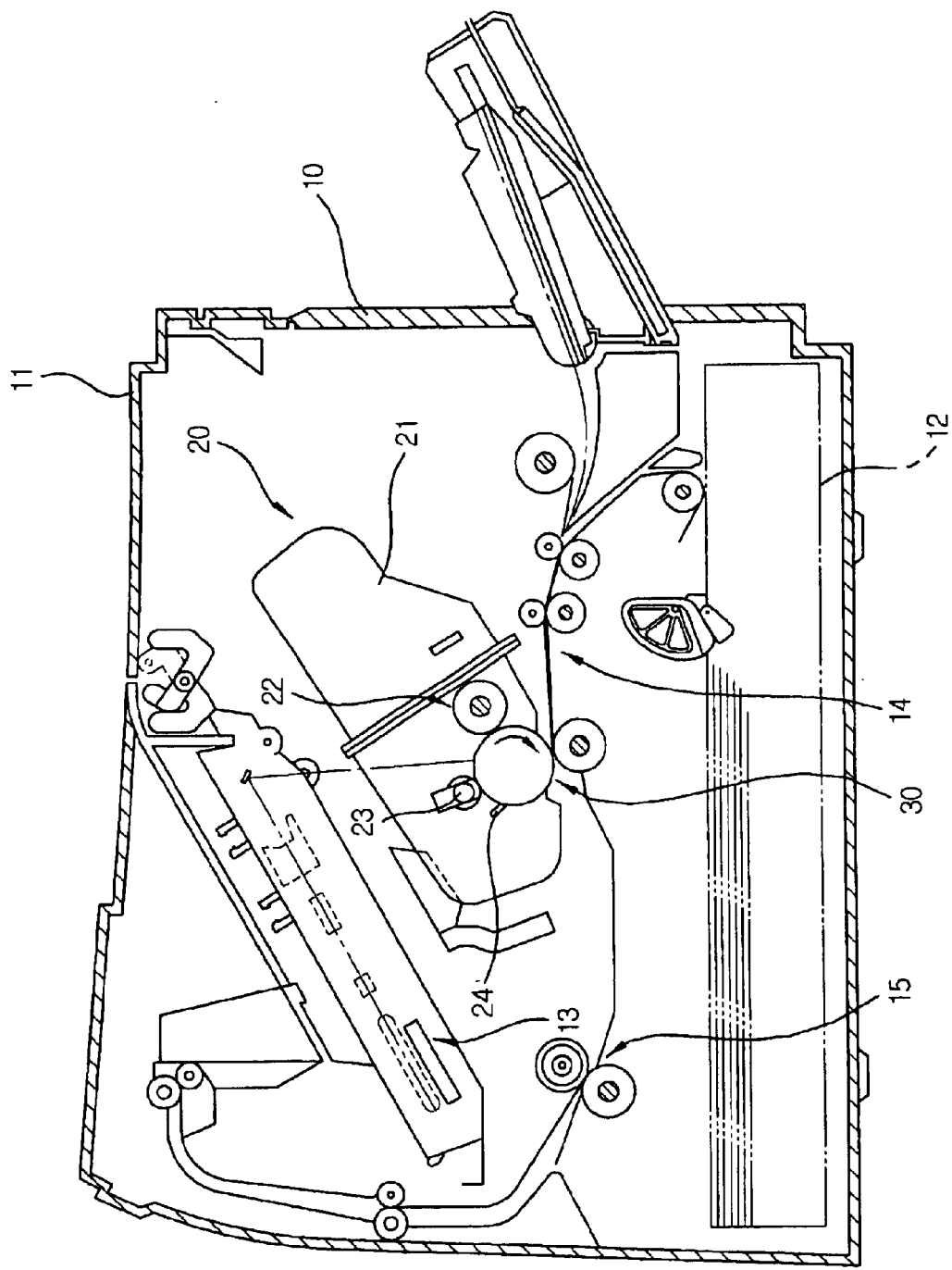
FIG. 2 is a schematic side view showing an electrophotographic printer having a coupling apparatus and a development cartridge according to the present invention.

Referring to FIG. 2, the electrophotographic printer according to the first embodiment of the present invention includes a main body 10 of the printer and a development cartridge 20, which is removably disposed at the main body 10. The development cartridge 20 prints an image on a printing paper.

A door 11 is disposed at an upper part of the main body 10. The door 11 opens and closes some part of the main body 10 to install and separate the development cartridge 20. Furthermore, a paper tray 12 which supplies the printing paper and a laser scanning unit 13 are disposed in the main body 10. The laser scanning unit 13 scans a light to a photosensitive drum 30 disposed at the development cartridge 20 according to printing information. An electrostatic latent image corresponding to a predetermined image is formed on a surface of the photosensitive drum 30 by the scanned light. The image is formed by a development agent such as toner. The toner is clung to an electrostatic latent image area, and the image is developed. Furthermore, a transferring unit 14 to transfer the printing paper and a fixing unit 15 to fix the image to the printing paper are further installed in the main body 10. The transferring unit 14 and the fixing unit 15 are generally known, thus a detailed description thereof is omitted here.

The development cartridge 20 has a photosensitive medium such as the photosensitive drum 30, a development roller 22, a charge roller 23 and a cleaning member 24. The photosensitive medium is rotatably disposed at a cartridge frame 21. The photosensitive drum 30 is rotated by transmitting a power by a coupling apparatus, which will be described later. The surface of the photosensitive drum 30 is charged to a predetermined electric potential by a voltage supplied from the charge roller 23. Moreover, the light scanned from the laser scanning unit 13 corresponding to the image information forms the electrostatic latent image on the surface of the photosensitive drum 30 corresponding to the predetermined image. The electrostatic latent image is developed by the toner, which is supplied by the development roller 22.

The toner is filled inside of the development cartridge 20 to a predetermined amount. The toner is supplied to the development roller 22 by a supplying unit (not shown). The development roller 22 is rotated by being connected with the photosensitive drum 30.

Figure 3:
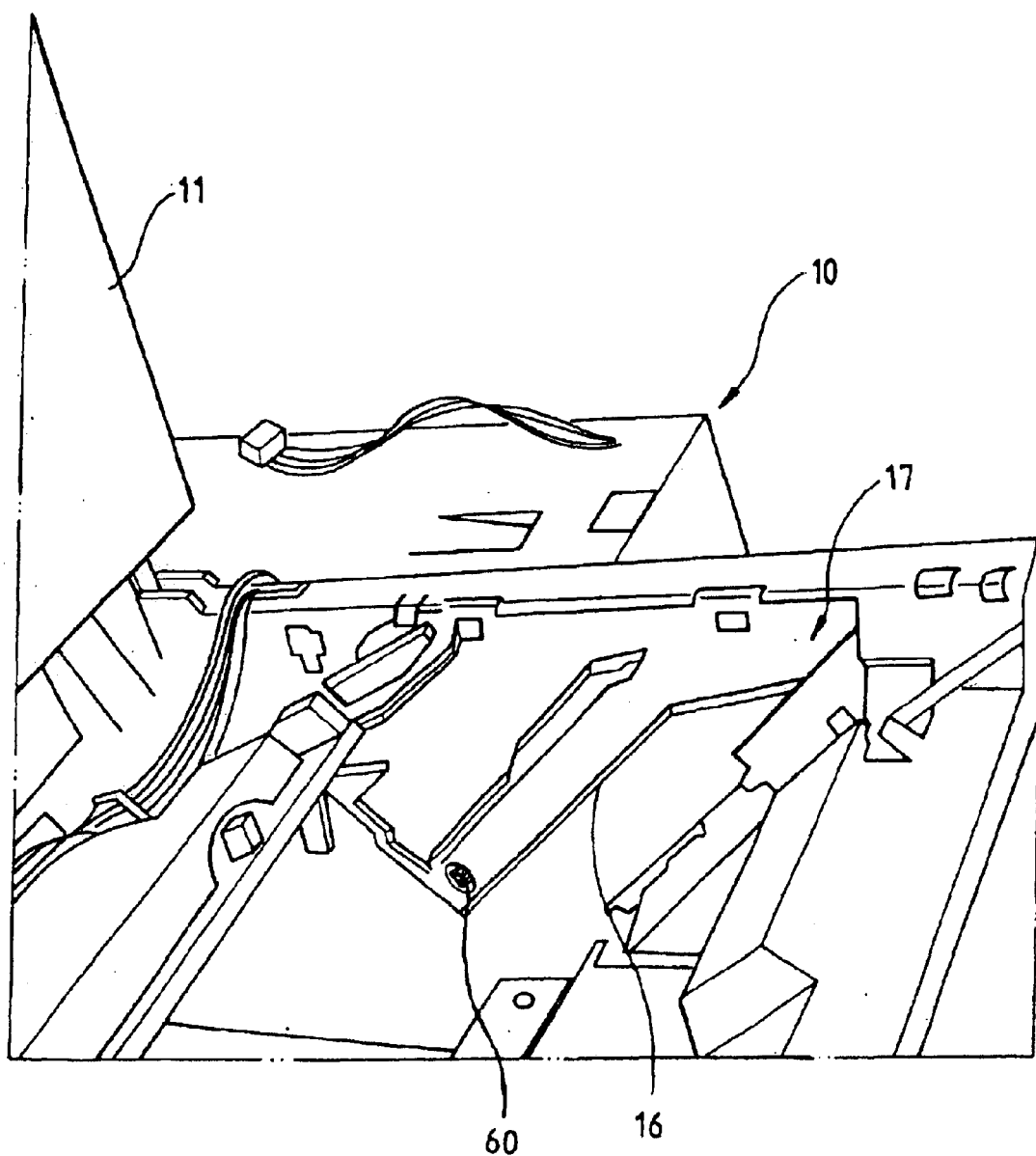
FIG. 3 is a schematic view of the main body of the printer of FIG. 2.

Moreover, referring to FIG. 3, a unit to settle and separate the development cartridge 20 is disposed at the main body 10. The settling and separating unit includes a guide member 16 to guide a movement of the development cartridge 20 when the development cartridge 20 is inserted into the main body 10, and a receptor 17 to receive the development cartridge 20. The receptor 17 has the guide member 16 disposed at both ends thereof. In other words, the guide member 16 can be integrally disposed at both sides of the inside of the receptor 17. The receptor 17 is opened and closed by the door 11.

In the above construction, in a state in which the development cartridge 20 is installed at the receptor 17, the coupling apparatuses respectively disposed at the development cartridge 20 and the main body 10 are engaged to each other by a connection unit. The detailed operation of the coupling apparatus will be described later. When the development cartridge 20 is installed at the receptor 17, the photosensitive drum 30 and each of the rollers 22, 23 are able to rotate as a rotation force is transmitted from the main body 10.

Figure 4:
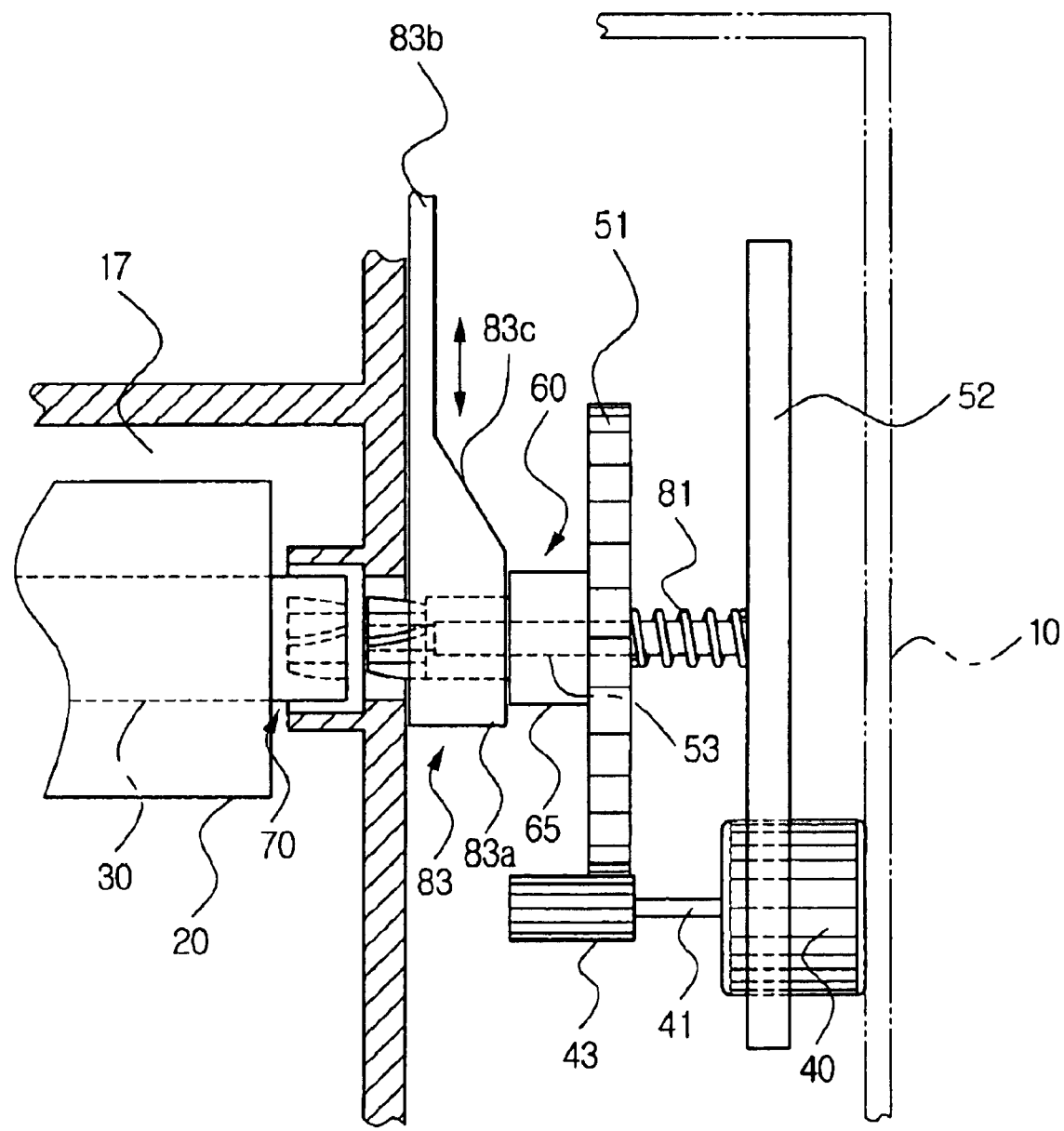
FIG. 4 is a schematic sectional view showing a coupling apparatus and a development cartridge according to an embodiment of the present invention.

Furthermore, referring to FIG. 4, a driving motor 40 is disposed in the main body 10 of the printer. Moreover, the coupling apparatus to transmit the power of the driving motor 40 to the photosensitive drum 30 is provided at the main body 10. The driving motor 40 is installed in the main body 10. A shaft gear 43 disposed at a driving shaft 41 thereof is engaged with a driving gear 51. The coupling apparatus comprises the driving gear 51, rotated by the rotation force transferred from the driving motor 40, a first coupler 60 coaxially connected to and rotated with the driving gear 51, and a second coupler 70 coaxially connected with one end of the photosensitive drum 30 and receiving the power when connected with the first coupler 60. The driving gear 51 is disposed to be rotated and slid in a shaft direction at a support shaft 53 in the main body 10. The support shaft 53 is settled at a support bracket 52 installed in the main body 10.

Figure 5:
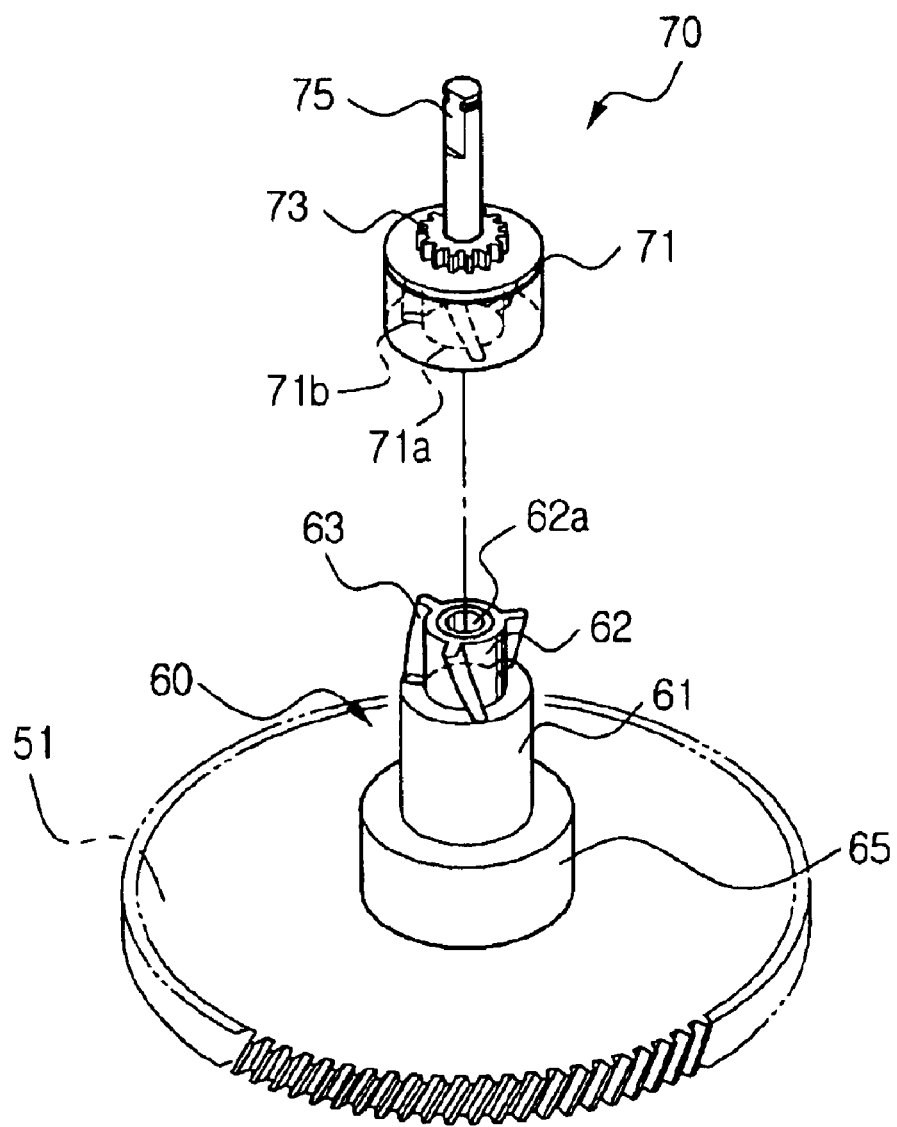
FIG. 5 is a perspective view showing the coupling apparatus of FIG. 4.

The first coupler 60 is connected with the driving gear 51 and is driven by the driving motor 40. The first coupler 60 will also be referred to as a 'driving coupler' (see below). The driving coupler 60 is integrally formed with the driving gear 51, and is supported by the support shaft 53 to rotate and slide. As shown in FIG. 5, the driving coupler 60 has a cylindrical-type connection portion 62 disposed at one end of a body 61, a spiral rib 63 spirally protruding at an outer circumference of the connection portion 62, and a flange portion 65 formed at the other end of the body 61 to have a greater outer diameter than that of the body 61. The connection portion 62 has a smaller outer diameter than that of the body 61, and has a shaft hole 62a at a center to embrace the support shaft 53. There are three of the spiral ribs 63, disposed at equal intervals, with a twisted-shape in a rotation direction. The spiral ribs 63 are integrally formed with the connection portion 62. Both sides of the spiral ribs 63 are formed as an involute curve or a cycloid curve. The flange portion 65 is integrally formed with the body 61, and is coaxially connected with the driving gear 51. Here, the driving coupler 60 and the driving gear 51 can be integrally formed.

The second coupler 70 is connected with the one end of the photosensitive drum 30. The second coupler 70 is rotated by the power transmitted from the driving coupler 60. The second coupler 70 also can be referred to as the 'slave coupler' (below). The slave coupler 70 includes a body 71 having a circular-type main hole 71a depressed at an end corresponding to the connection portion 62, and spiral grooves 71b formed at an inner circumference of the main hole 71a corresponding to the spiral ribs 63; a slave gear 73;

and a slave shaft 75. Therefore, there are three of the spiral grooves 71b, disposed at equal intervals corresponding to the spiral ribs 63. The slave gear 73 is integrally formed at another end of the body 71. The slave gear 73 gears the development roller 22 and the charge roller 23 of FIG. 2. Thus, the slave gear 73 is engaged with gears (not shown) provided at each of the rollers 22, 23. The slave gear 73 and the slave coupler 70 are installed at a slave shaft 75 and rotated together. The slave shaft 75 is installed at one end of the photosensitive drum 30 and can be rotated therewith.

When the couplers 60, 70 are connected, the connection portion 62 and the spiral ribs 63 are inserted into and connected with the main hole 71a and the spiral grooves 71b, since the driving coupler 60 rotates and approaches the slave coupler 70. When each of the couplers 60, 70 is separated from the other, the driving coupler 60 recedes from the slave coupler 70.

The connection and separation of the couplers 60, 70 will now be described. As shown in FIG. 4, the connection unit is disposed at the support shaft 53, and has a press spring 81 to press the driving gear 51 and the driving coupler 60 to the slave coupler 70. The separation unit separates the driving coupler 60 from the slave coupler 70 by overcoming the pressure of the press spring 81. The separation unit has the flange portion 65, and an interference lever 83 to move the driving coupler 60 by selectively contacting the flange portion 65. The interference lever 83 is disposed in the main body 10 to be elevated by a moving unit (not shown), and each end of the interference lever 83 has a different width. In other words, a lower part 83a of the interference lever 83 is thicker than an upper part 83b of the interference lever 83, and a sloping side 83c is provided between the parts 83a, 83b.

When the interference lever 83 is elevated, the sloping side 83c interferes with the flange portion 65, and pushes the flange portion 65 away from the slave coupler 70. When the interference lever 83 is completely elevated, the flange portion 65 contacts the lower part 83a of the interference lever 83 and is separated from the slave coupler 70. On the other hand, when the interference lever 83 descends, the upper part 83b of the interference lever 83 contacts the flange portion 65, and the driving coupler 60 is connected with the slave coupler 70 by being pressed by the press spring 81.

Here, the interference lever 83 can be elevated by being geared in accordance with an opening and closing of the door 11, by a user's manual operation, or by various other methods.

In a state of opening the receptor 17 by opening the door 11, as shown in FIG. 3, the development cartridge 20 can be installed in the receptor 17, as shown in FIG. 4. At this time, the interference lever 83 is elevated, and the driving coupler 60 contacts the lower part 83a of the interference lever 83. Thus, the interference lever 83 does not interfere with the development cartridge 20. Therefore, in this state, the development cartridge 20 can be installed and separated to and from the receptor 17.

Figure 6:
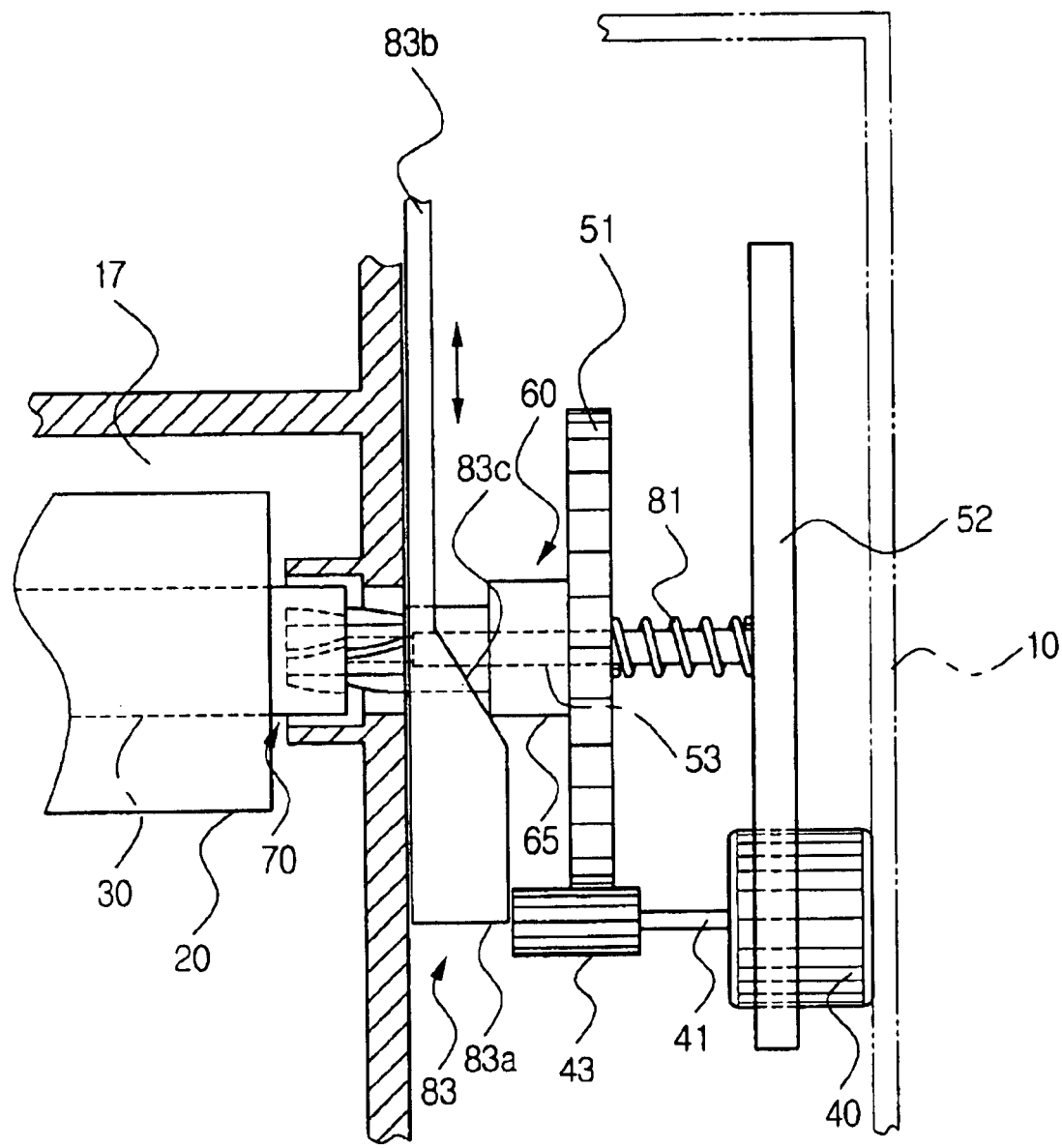
FIG. 6 is a view explaining the operation of the coupling apparatus of FIG. 4.
Figure 7:
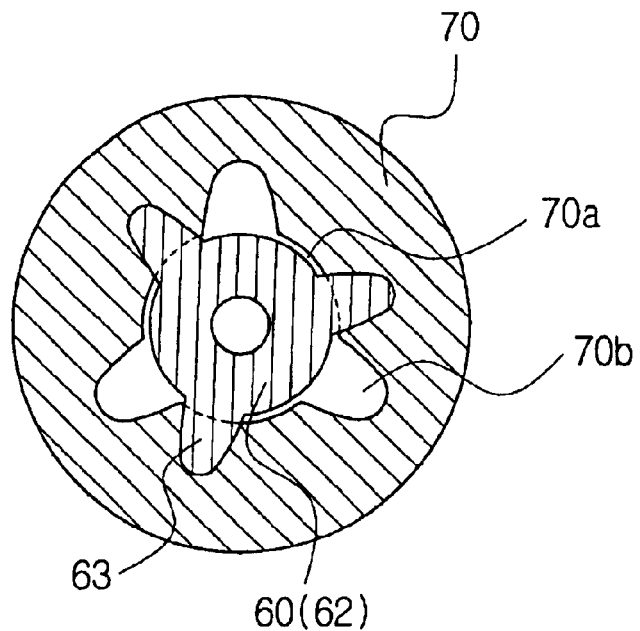
FIGS. 7 and 8 are views explaining the relationships between the couplers of FIG. 4.

Then, as shown in FIG. 6, the interference lever 83 descends by using a predetermined method. At this time, the upper part 83b having a relatively thinner width than that of the lower part 83a faces the flange portion 65. Therefore, the driving gear 51 and the driving coupler 60, pushed away to the right side in FIG. 6, are moved to the slave coupler 70 by the pressure of the press spring 81. Then, one end of the driving coupler 60 contacts one end of the slave coupler 70. In this state, as shown in FIG. 7, the connection portion 62 and the spiral ribs 63 might not exactly coincide with the main hole 70a and the spiral grooves 70b, and their centers also might not coincide.

Figure 8:
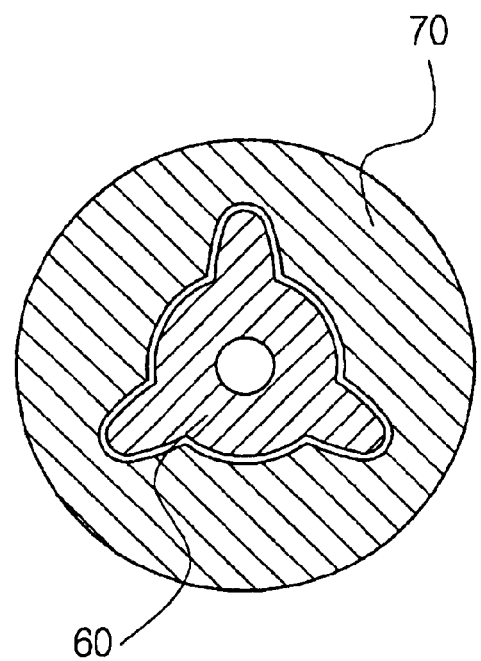
Figure 9:
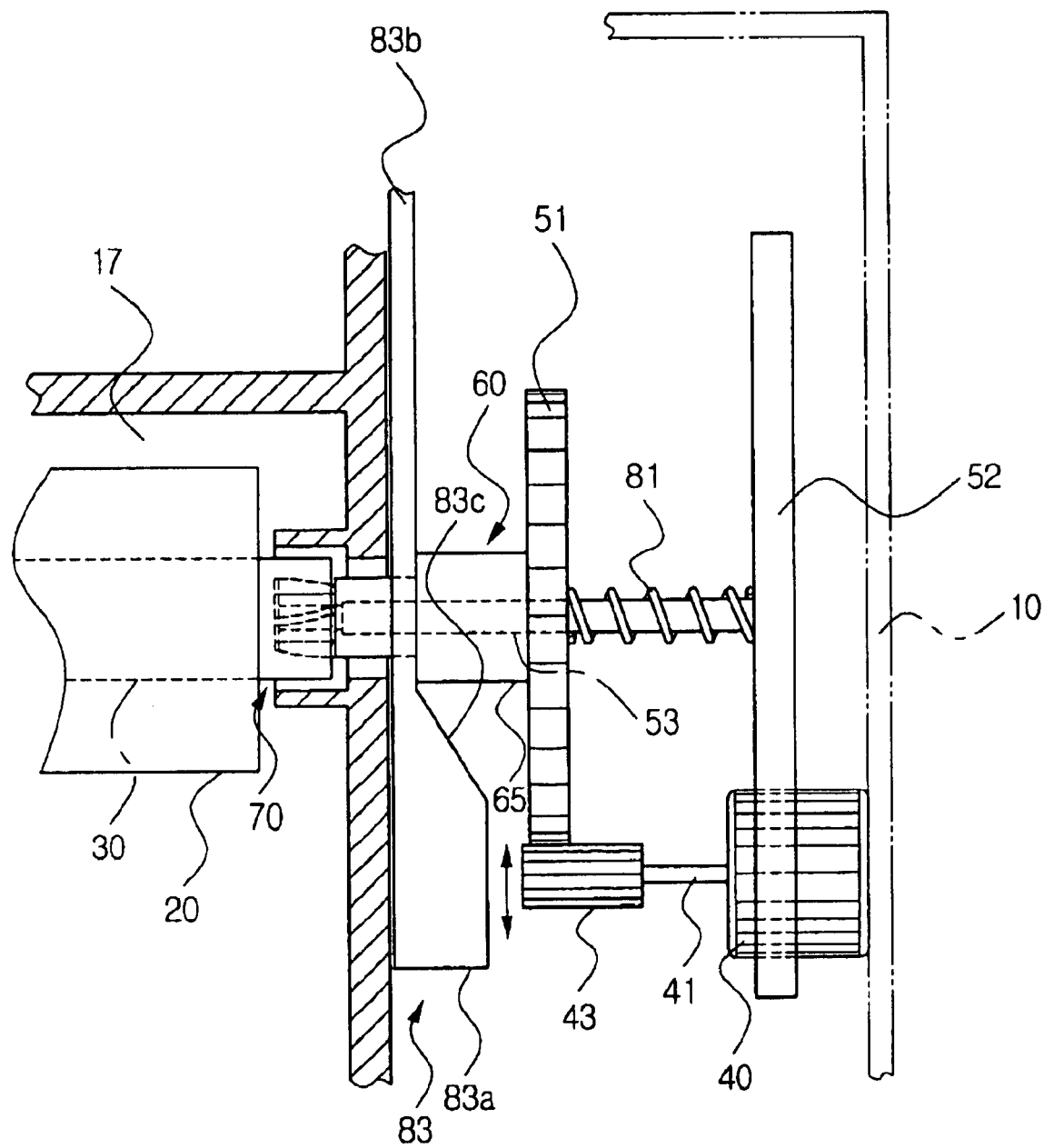
FIG. 9 is a view showing the couplers of FIG. 4 in a connected state.

On the other hand, in the state in which the couplers 60, 70 contact each other, when the driving motor 40 is driven, the driving gear 51 is rotated and also rotates the driving coupler 60. Then, the driving coupler 60 is relatively rotated with respect to the slave coupler 70, and the connection portion 62 and the spiral ribs 63 coincide with the main hole 71a and the spiral grooves 71b, as shown in FIG. 8. In this state, when the driving coupler 60 is further rotated, the spiral ribs 63 are rotated along the spiral grooves 71b and are connected with the slave coupler 70 by being inserted therein. As shown in FIG. 9, when the driving coupler 60 is completely connected with the slave coupler 70, then the slave coupler 70 is rotated with the driving coupler 60 by power transmitted from the driving coupler 60.

In the meantime, in the above process, when each of the couplers 60, 70 is connected with the other, as the spiral ribs 63 and the spiral grooves 71b are respectively formed as an involute curve or a cycloid curve, the connection of the couplers 60, 70 is similar to an engaged internal gear. Accordingly, even though the rotation centers of the couplers 60, 70 do not coincide, each of the couplers 60, 70 rotate at a constant velocity, as the spiral ribs 63 and the spiral grooves 71b slide at a side of contact. Thus, although the rotation centers of the couplers 60, 70 do not coincide due to an installation error, the photosensitive drum 30 can be rotated at a constant velocity. Consequently, the accuracy of the image will be improved.

Furthermore, when the couplers 60, 70 separate from each other, the interference lever 83 descends, and the flange portion 65 contacts the sloping side 83c of the interference lever 83 and is pushed away. Thus, the spiral ribs 63 are relatively rotated with respect to the spiral grooves 71b and are separated from each other.

Figure 10:
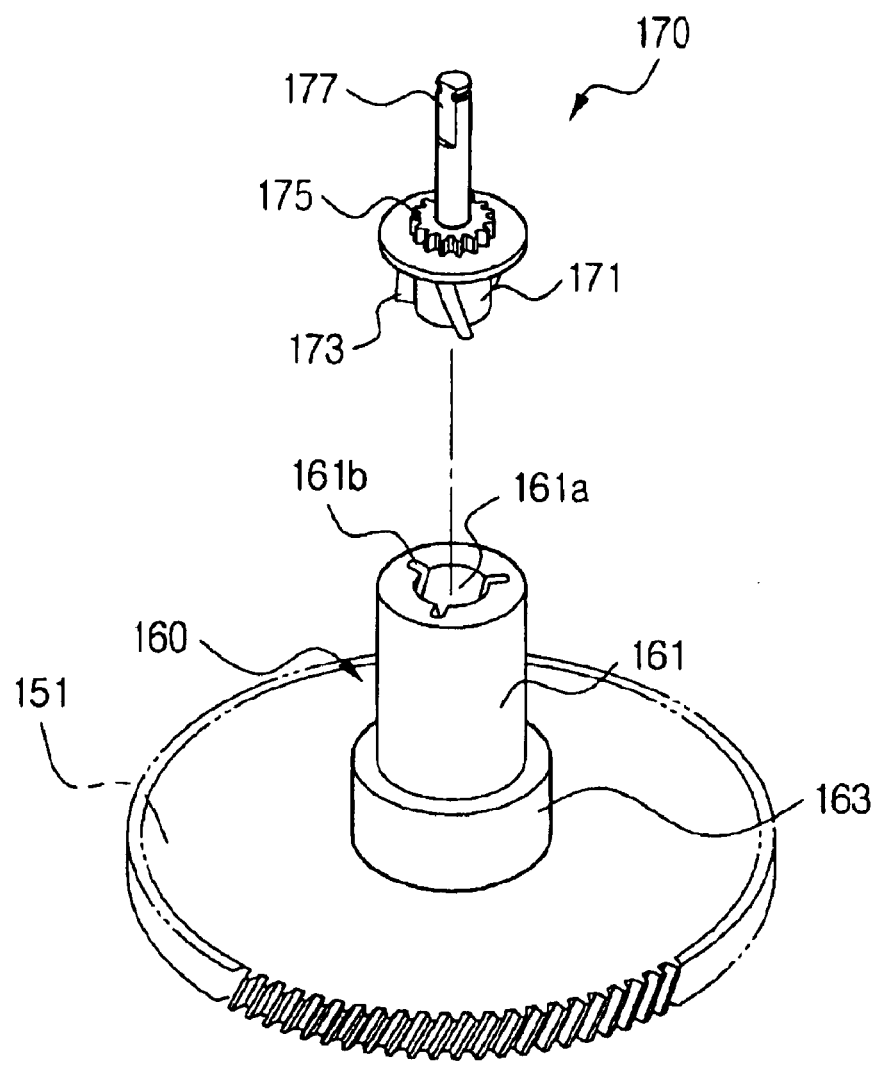
FIG. 10 is a schematic perspective view showing a coupling apparatus according to another embodiment of the present invention.

Referring to FIG. 10, according to a second embodiment of the present invention, the coupling apparatus comprises a driving coupler 160 coaxially connected with a driving gear 151, and a slave coupler 170 relatively connected with the driving coupler 160.

The driving coupler 160 includes a body 161 having an outer diameter with a predetermined size, and a flange portion 163 formed to have a greater outer diameter than that of the body 161 at one end of the body 161. The body 161 includes a circular-type main hole 161a and spiral grooves 161b spirally depressed at an inner circumference of the main hole 161a. The flange portion 163 is integrally formed with the body 161 and is connected with the driving gear 151. The driving coupler 160 having the above construction is disposed at the support shaft 53 to rotate and slide, like the driving coupler 60 shown in FIG. 4. Moreover, the flange portion 163 is disposed to allow the driving coupler 160 to slide on the support shaft 53.

The slave coupler 170 comprises a cylindric connection portion 171 at one end, and spiral ribs 173 spirally protruded at an outer circumference of the connection portion 171. The connection portion 171 corresponds to the main hole 161a, and the spiral ribs 173 are formed as a type corresponding to the spiral grooves 161b. Moreover, both sides of the spiral ribs 173 are formed as an involute curve or a cycloid curve, like the spiral grooves 161b. In addition, the slave coupler 170 is connected with a slave gear 175 and these elements are rotated together. The slave coupler 170 and the slave gear 175 are supported by being connected with a slave shaft 177. The slave shaft 177 is connected with one end of the photosensitive drum 30 (refer to FIG. 4).

When the driving coupler 160 is rotated, the main hole 161a and the spiral grooves 161b are connected with the connection portion 171 and the spiral ribs 173 as the main hole 161a and the spiral grooves 161b relatively embrace the connection portion 171 and the spiral ribs 173.

Figure 11:
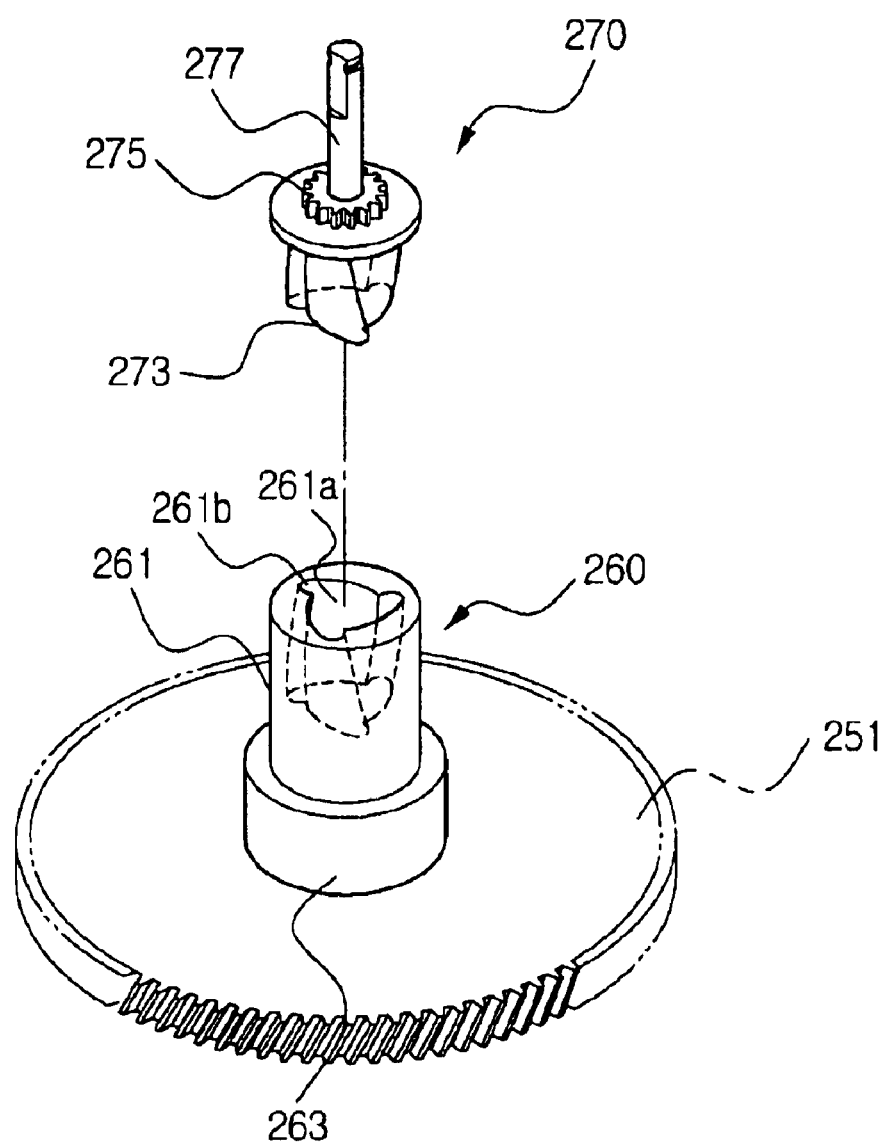
FIG. 11 is a schematic perspective view showing a coupling apparatus according to still another embodiment of the present invention.
Figure 12A:
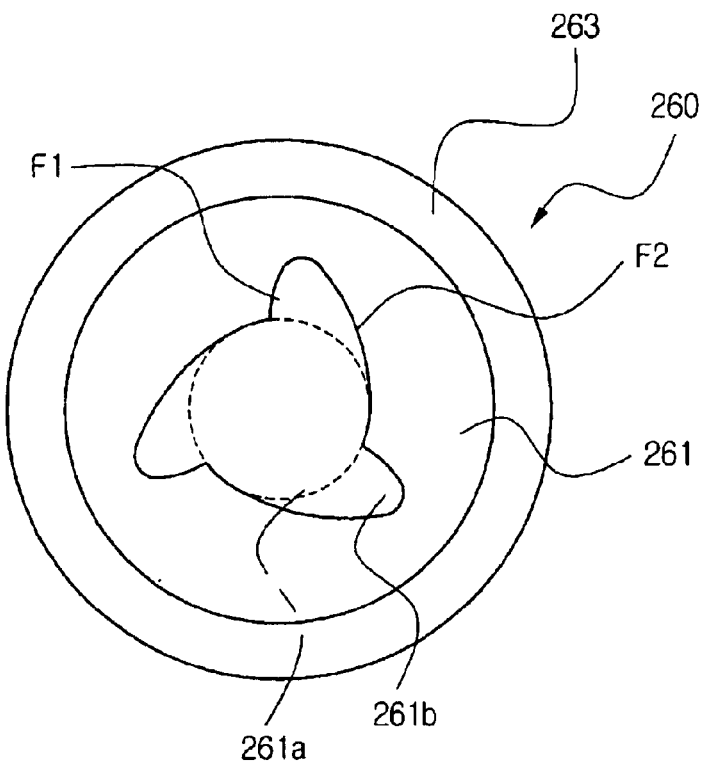
FIGS. 12A and 12B are side views respectively showing the driving coupler and the slave coupler of FIG. 11.

Referring to FIG. 11, according to a third embodiment of the present invention, the coupling apparatus includes a driving coupler 260 coaxially connected with a driving gear 251, and a slave coupler 270 that can be connected and separated with and from the driving coupler 260. The driving coupler 260 has a cylindrical-type body 261, and a flange portion 263 integrally formed at one end of the body 261. The body 261 has a main hole 261a formed at a predetermined depth at an end portion thereof, and spiral grooves 261b spirally depressed at an inner circumference of the main hole 261a. As shown by a dotted line in FIG. 12A, the main hole 261a has a circular shape as viewed in cross-section. The spiral grooves 261b are spirally formed to have a predetermined sectional area at an inner circumference of the main hole 261a. Here, one side F1 of each of the spiral grooves 261b is formed as an involute curve or a cycloid curve. Side F2 prevents the side F1 from being broken by supporting the side F1. In other words, the sectional areas of the main hole 261a and the spiral grooves 261b have a pinwheel-type shape.

Figure 12B:
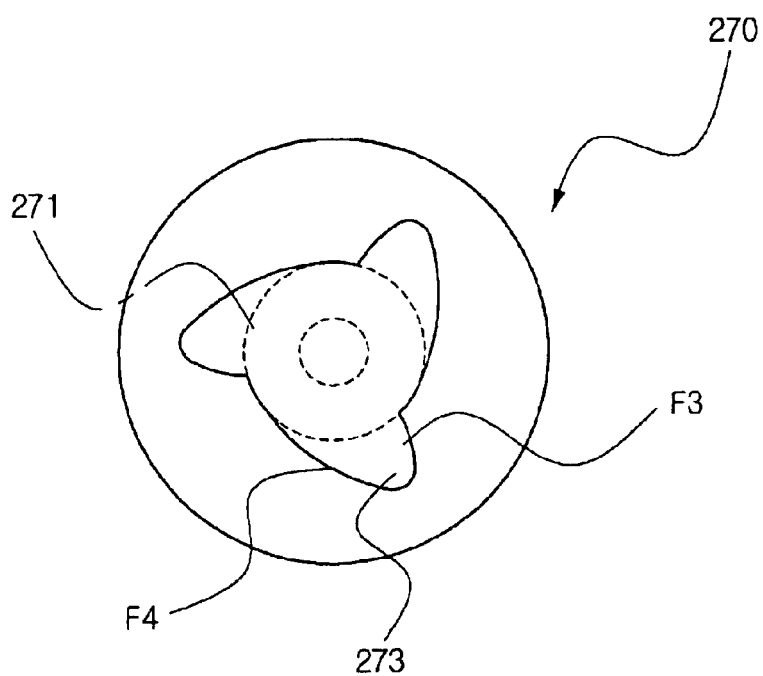

As shown in FIG. 12B, the slave coupler 270 has spiral ribs 273 spirally protruding from an imaginary cylindrical-type connection portion 271 at one end. The spiral ribs 273 are formed as a sectional area corresponding to the spiral grooves 261b, and are twisted in a rotation direction. Furthermore, one side F3 of each of the spiral ribs 273 is formed as an involute curve or a cycloid curve. In addition, another side F4 of each of the spiral ribs 273 is formed as an arc. Therefore, when the spiral ribs 273 are inserted into the spiral grooves 261b and rotated, each of the sides F1, F3 contact each other and slide. Moreover, the other side F4 of the spiral ribs 273 prevents side F3, which receives power, from being broken by supporting the side F3.

On the other hand, as the main hole 261a and the spiral grooves 261b are provided, a relatively lower load is given to the slave coupler 270. Accordingly, the spiral ribs 273 can be effectively prevented from being broken. Additionally, a slave gear 275 and a slave shaft 277 are connected with another end of the slave coupler 270. The slave shaft 277 is connected with the photosensitive drum 30 of the development cartridge 20 (refer to FIG. 2).

Figure 13:
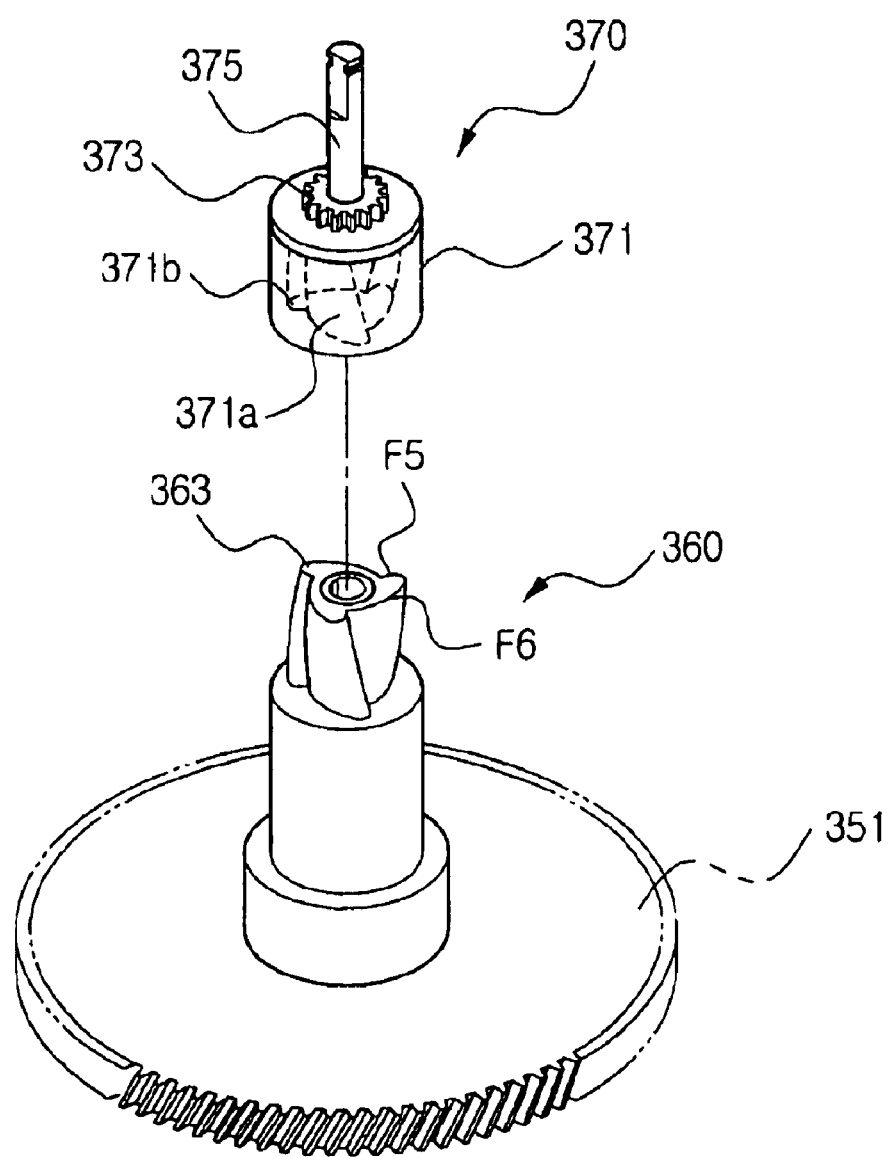
FIG. 13 is a schematic perspective view showing a coupling apparatus according to yet another embodiment of the present invention.

Referring to FIG. 13, according to a fourth embodiment of the present invention, the coupling apparatus includes a driving coupler 360 coaxially connected with a driving gear 351, and a slave coupler 370 connected with the development cartridge 20 (refer to FIG. 2) and relatively connected and separated with and from the driving coupler 360.

Here, the driving coupler 360 has spiral ribs 363 having the same construction as the slave coupler 270 shown in FIG. 11. Therefore, one side F5 of each of the spiral ribs 363 is formed as an involute curve or a cycloid curve and twisted. Another side F6 of each of the spiral ribs 363 is formed as an arc configuration. Moreover, the slave coupler 370 has a body 371 with a main hole 371a depressed by a predetermined depth. The main hole 371a has spiral grooves 371b corresponding to the spiral ribs 363. A slave gear 373 and a slave shaft 375 are connected with another end of the body 371 and rotated together.

Here, the relative connection and the separation of the driving coupler 360 and the slave coupler 370 are the same as in the previous embodiment of the present invention, thus the description will be omitted here.

According to the coupling apparatus of the present invention, the power is transmitted as the driving coupler and the slave coupler are connected with each other by being relatively rotated. Both sides of the spiral ribs and the spiral grooves which connect with each other are formed as an involute curve or a cycloid curve, thus the power can be transmitted at a constant velocity even though the rotation centers do not coincide.

Moreover, in the development cartridge and the electro-photographic printer having the same according to the present invention, the slave coupler is provided at one end of the photosensitive drum corresponding to the driving coupler disposed at the main body of the printer, and each of the couplers is connected with the other by the spiral ribs and the spiral grooves. Accordingly, a rotation velocity of the development cartridge with respect to the rotation velocity of the driving motor can be constantly maintained. Thus, the accuracy of the image formed on the photosensitive drum can be improved.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A connectable/separable coupling apparatus to transfer a rotation force, comprising:
    a first coupler comprising:
        a cylindrical-type connection portion at an end thereof, and
        a spiral rib spirally protruding from an outer circumference of the connection portion; and
    a second coupler comprising:
        a circular-type main hole depressed at an end thereof, corresponding to the connection portion, and
        a spiral groove formed at an inner circumference of the main hole corresponding to the spiral rib,
    the connection portion and the spiral rib being connected with the main hole and the spiral groove, respectively, by being pressed, and the rotation force being transmitted from the first coupler to the second coupler by rotating the first and second couplers together.

2. The coupling apparatus according to claim 1, wherein the spiral rib comprises a side formed as an involute curve or a cycloid curve.

3. The coupling apparatus according to claim 1, wherein the spiral rib comprises a side formed as an arc.

4. The coupling apparatus according to claim 1, comprising three of the spiral ribs and three of the spiral grooves, disposed at equal intervals.

5. A connectable/separable coupling apparatus to transfer power in a connected state, the coupling apparatus comprising:
    a driving gear engaged with a driving motor;
    a first coupler comprising:
        a first end connected with the driving gear,
        a cylindrical-type connection portion at a second end, and
        a spiral rib spirally protruding at an outer circumference of the connection portion; and
    a second coupler comprising:
        a circular-type main hole depressed at an end thereof corresponding to the connection portion, and
        a spiral groove formed at an inner circumference of the main hole corresponding to the spiral rib, the connection portion and the spiral rib being connected with the main hole and the spiral groove, respectively, by being pressed, and a rotation force being transmitted from the first coupler to the second coupler by rotating the first and second couplers together.

6. The coupling apparatus according to claim 5, wherein the spiral rib comprises a side formed as an involute curve or a cycloid curve.

7. The coupling apparatus according to claim 5, wherein the spiral rib comprises a side formed as an arc.

8. The coupling apparatus according to claim 5, comprising three of the spiral ribs and three of the spiral grooves, disposed at equal intervals.

9. The coupling apparatus according to claim 5, further comprising:
   a slave gear integrally formed with the second coupler, wherein
   the driving gear and the first coupler are integrally formed.

10. The coupling apparatus according to claim 5, wherein the first coupler further comprises:
    a cylindrical-type body having the connection portion integrally formed at a first end of the cylindrical-type body; and
    a flange portion extending from a second end of the cylindrical-type body and connected with the driving gear by being integrally formed to have a greater outer circumference than an outer circumference of the cylindrical-type body.

11. A connectable/separable coupling apparatus to transfer power in a connected state, the coupling apparatus comprising:
    a slave shaft;
    a slave gear connected with an end of the slave shaft;
    a slave coupler connected to and rotated with the slave gear, the slave coupler comprising:
        a cylindrical-type connection portion, and
        a spiral rib spirally protruding from an outer circumference of the connection portion;
    a driving motor;
    a driving gear engaged with the driving motor; and
    a driving coupler comprising:
        a first end connected with the driving gear,
        a circular-type main hole depressed at a second end of the driving coupler corresponding to the connection portion, and
        a spiral groove formed at an inner circumference of the main hole corresponding to the spiral rib,
    the connection portion and the spiral rib being respectively connected with the main hole and the spiral groove by being inserted therein, and a rotation force being transferred from the driving gear to the slave gear by rotating the driving gear and the slave gear together.

12. The coupling apparatus according to claim 11, wherein the spiral rib comprises a side formed as an involute curve or a cycloid curve.

13. The coupling apparatus according to claim 11, wherein the spiral rib comprises a side formed as an arc.

14. The coupling apparatus according to claim 11, comprising three of the spiral ribs and three of the spiral grooves, disposed at equal intervals.

15. The coupling apparatus according to claim 11, wherein:
    the driving gear and the driving coupler are integrally formed, and
    the slave gear and the slave coupler are integrally formed.

16. The coupling apparatus according to claim 11, wherein the driving coupler further comprises:
    a cylindrical-type body having the main hole and the spiral groove formed at a first end thereof; and
    a flange portion extending from a second end of the body and connected with the driving gear by being integrally formed to have a greater outer circumference than an outer circumference of the body.

17. A development cartridge disposed at an electrophotographic printer comprising a driving motor; a driving gear to transmit power by being connected with the driving motor; a first coupler coaxially connected to and rotated with the driving gear, having a cylindrical-type connection portion at an end thereof, and a spiral rib protruded from an outer circumference of the connection portion; and a development cartridge settlement unit to expose the connection portion to an outside, the development cartridge being removably connected with the development cartridge settlement unit, and to develop an image on a printing paper, the development cartridge comprising:
    a cartridge frame;
    a photosensitive drum rotatably disposed at the cartridge frame; and
    a second coupler coaxially connected with an end of the photosensitive drum, comprising:
    a circular-type main hole depressed at an end corresponding to the connection portion, and
    a spiral groove formed at an inner circumference of the main hole corresponding to the spiral rib,
    the first coupler being connected with the second coupler by being rotated and inserted into the second coupler, a rotation force of the driving motor being transmitted from the first coupler to the second coupler by rotating the first and second couplers together.

18. The development cartridge according to claim 17, wherein the spiral rib comprises a side formed as an involute curve or a cycloid curve.

19. The development cartridge according to claim 17, wherein the spiral rib comprises a side formed as an arc.

20. A development cartridge disposed at an electrophotographic printer comprising a driving motor; a driving gear to transmit power by being connected with the driving motor; a driving coupler coaxially connected to and rotated with the driving gear, having a circular-type main hole at an end thereof and a spiral groove spirally depressed at an inner circumference of the main hole; and a development cartridge settlement unit to expose an end of the driving coupler to an outside, the development cartridge being removably connected with the development cartridge settlement unit, and to develop an image on a printing paper, the development cartridge comprising:
    a cartridge frame;
    a photosensitive drum rotatably disposed at the cartridge frame; and
    a slave coupler coaxially connected with the photosensitive drum and rotated, the slave coupler comprising:
        a pole-type connection portion at an end thereof corresponding to the main hole, and
        a spiral rib spirally protruding at an outer circumference of the connection portion corresponding to the spiral groove,
    the connection portion and the spiral rib being relatively rotated and inserted into the main hole and the spiral groove, respectively, to connect the couplers and transmit a rotation force.

21. The development cartridge according to claim 20, wherein the spiral rib comprises a side formed as an involute curve or a cycloid curve.

22. The development cartridge according to claim 20, wherein the spiral rib comprises a side formed as an arc configuration.

23. An electrophotographic printer comprising:
a main body having a cartridge fixing unit;
a development cartridge removably connected with the cartridge fixing unit to develop an image on a printing paper;
a driving motor installed in the main body;
a driving gear to transmit a rotation force from the driving motor and to rotate;
a driving coupler comprising:
a first end coaxially connected with the driving gear,
a cylindrical-type connection portion, and
a spiral rib spirally protruded from an outer circumference of the connection portion at a second end of the driving coupler, movably disposed in an axial direction to be exposed to the cartridge fixing unit; and
a connecting and separating unit to connect and separate the development cartridge with and from the main body,
the development cartridge comprising:
a photosensitive drum,
a development unit to develop the image on the photosensitive drum,
a slave coupler coaxially connected to the photosensitive drum, having a cylindrical-type main hole at a first end of the slave coupler corresponding to the connection portion, and
a spiral groove depressed in an inner circumference of the main hole corresponding to the spiral rib,
the rotation force being transmitted to the slave coupler when connected with the driving coupler, a power of the driving motor being transmitted to the photosensitive drum, and the couplers being connected by relative rotation thereof.

24. The electrophotographic printer according to claim 23, further comprising:
a support shaft installed in the main body to support and coaxially rotate the driving gear and the driving coupler;
a connection unit disposed in the fixing unit to connect the driving coupler with the slave coupler; and
a separating unit to separate the driving coupler from the slave coupler so as to connect and separate the development cartridge with and from the fixing unit.

25. The electrophotographic printer according to claim 23, further comprising:
shaft holes formed at the first and second couplers to rotatably embrace the support shaft, wherein
the driving gear and the driving coupler are integrally formed.

26. The electrophotographic printer according to claim 23, wherein the slave coupler further comprises:
a body comprising the main hole and the spiral groove;
a slave shaft at a second end of the body and connected with an end of the photosensitive drum; and
a slave gear at the slave shaft to transmit the power of the driving motor from the driving coupler to the development unit.

27. The electrophotographic printer according to claim 23, wherein the spiral rib comprises a side formed as an involute curve or a cycloid curve.

28. The electrophotographic printer according to claim 23, wherein the spiral rib comprises a side formed as an arc.

29. An electrophotographic printer comprising:
a main body comprising a cartridge fixing unit;
a development cartridge removably disposed at the cartridge fixing unit to develop an image on a printing paper;
a driving motor installed in the main body;
a driving gear to transmit a rotation force from the driving motor and to rotate;
a driving coupler rotated by being coaxially connected with the driving gear, the driving coupler comprising:
a circular main hole at an end thereof, and
a spiral groove spirally depressed at an inner circumference of the main hole,
the driving coupler being movably disposed in an axial direction to expose the end of the driving coupler to the fixing unit; and
a connecting and separating unit to connect and separate the development cartridge with and from the main body,
the development cartridge comprising:
a photosensitive drum;
a development unit to develop the image on the photosensitive drum; and
a slave coupler coaxially connected with an end of the photosensitive drum, having a connection portion having a sectional area corresponding to the main hole at an end thereof, and a spiral rib spirally protruding from an outer circumference of the connecting and separating unit and corresponding to the spiral groove,
a power of the driving motor being transmitted to the photosensitive drum, and the first and second couplers being connected by a relative rotation thereof.

30. The electrophotographic printer according to claim 29, wherein the spiral rib comprises a side formed as an involute curve or a cycloid curve.

31. The electrophotographic printer according to claim 29, wherein the spiral rib comprises a side formed as an arc.

32. A coupling apparatus to transfer a rotation force, comprising:
a first coupler comprising a spiral rib spirally protruding therefrom; and
a second coupler comprising a hole formed therein, and a spiral groove formed within the hole and corresponding to the spiral rib,
the rotation force being from one of the first and second couplers to another one of the first and second couplers by rotating the first and second couplers together.

33. The coupling apparatus according to claim 32, wherein:
the first coupler is driven by a motor and rotates about a first axis,
the second coupler drives a photosensitive drum and rotates about a second axis different from the first axis, and
the photosensitive drum rotates at a constant speed.

34. The coupling apparatus according to claim 33, wherein the spiral rib and the spiral groove comprise a twisted shape.

35. The coupling apparatus according to claim 33, wherein the spiral rib and the spiral groove comprise an involute curve or a cycloid curve.

36. The coupling apparatus according to claim 32, wherein the second coupler drives the first coupler.

37. A development cartridge disposed at an electrophotographic printer comprising a driving motor and a first coupler driven by the driving motor and comprising a first spiral rib, the development cartridge comprising:
   a second coupler driven by the first coupler, the second coupler comprising a second spiral rib corresponding to the first spiral rib; and
   a photosensitive drum driven by the second coupler.

38. The development cartridge according to claim 37, wherein the first coupler is connected with the second coupler by relative rotation therebetween.

39. The development cartridge according to claim 37, wherein the first spiral rib comprises a groove and the second spiral rib comprises a protrusion.

40. The development cartridge according to claim 37, wherein the second spiral rib comprises a groove and the first spiral rib comprises a protrusion.

41. An electrophotographic printer comprising:
   a driving motor;
   a first coupler driven by the driving motor and comprising a first spiral rib; and
   a development cartridge comprising:
      a second coupler driven by the first coupler, the second coupler comprising a second spiral rib corresponding to the first spiral rib, and
      a photosensitive drum driven by the second coupler.

42. The electrophotographic printer according to claim 41, wherein:
   the first coupler rotates about a first axis,
   the second coupler rotates about a second axis different from the first axis, and
   the photosensitive drum rotates at a constant speed.

* * * * *